May 31, 1932.  T. R. HARRISON  1,860,777
MARINE FLOW METER
Filed March 21, 1927
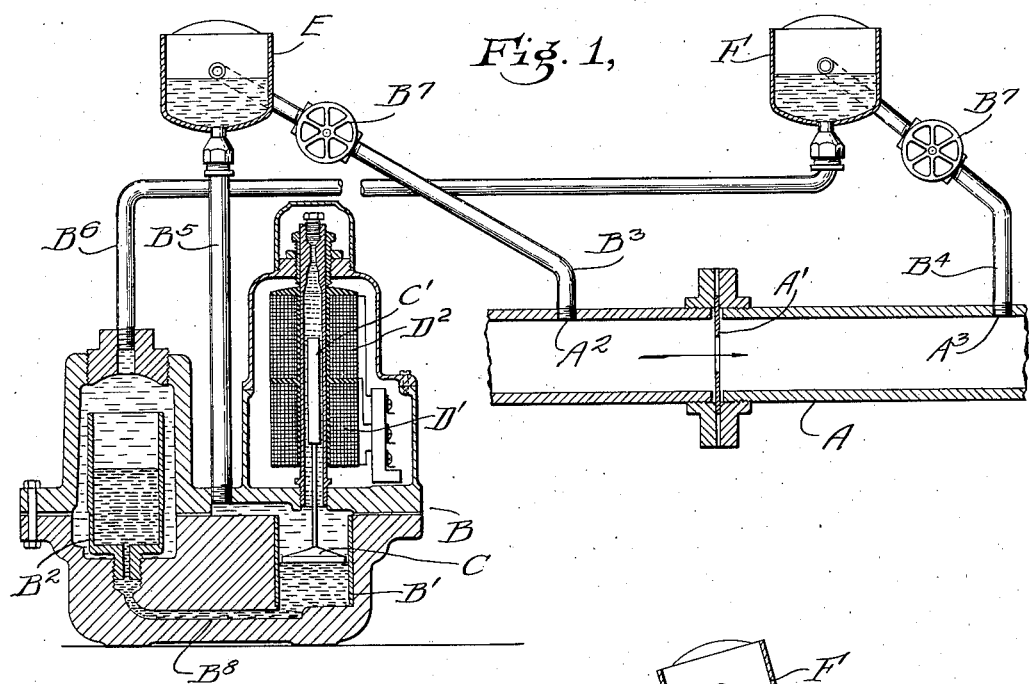
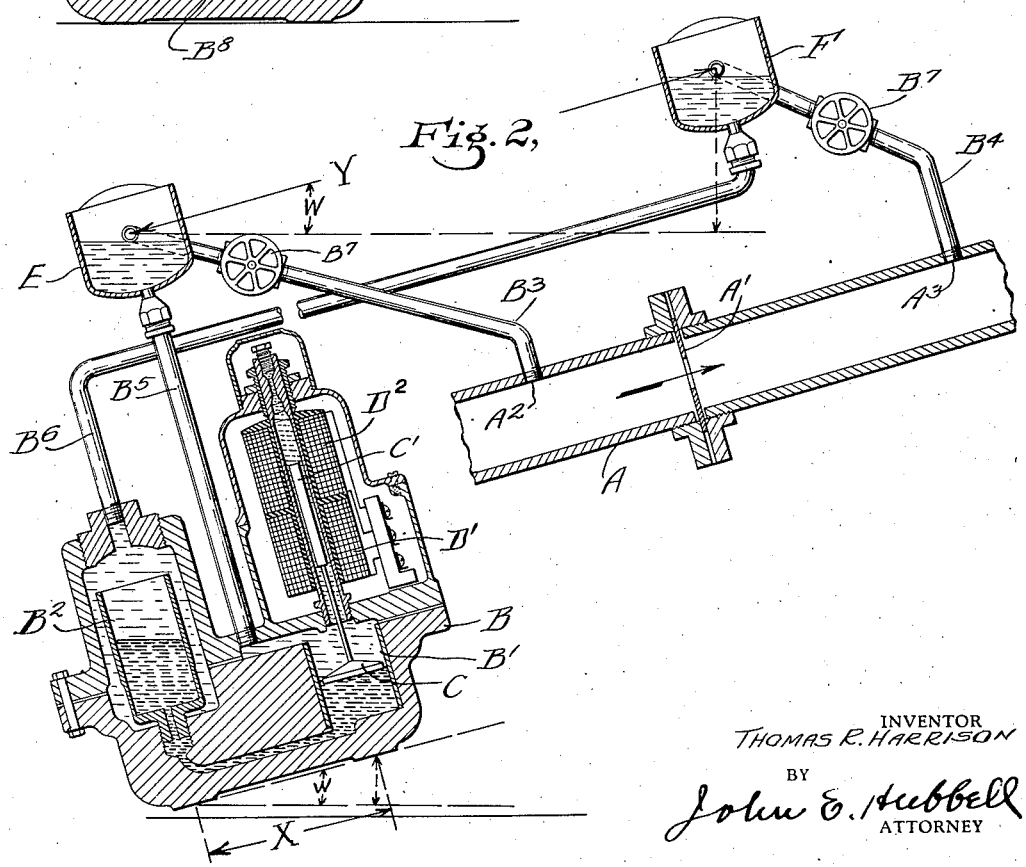
INVENTOR
THOMAS R. HARRISON
BY
John E. Hubbell
ATTORNEY Patented May 31, 1932

1,860,777

UNITED STATES PATENT OFFICE

THOMAS R. HARRISON, OF WYNCOTE, PENNSYLVANIA, ASSIGNOR TO THE BROWN INSTRUMENT COMPANY, OF PHILADELPHIA, PENNSYLVANIA, A CORPORATION OF PENNSYLVANIA

MARINE FLOW METER

Application filed March 21, 1927. Serial No. 177,098.

The present invention relates to flow meter manometers and particularly to flow meter manometers used on shipboard. The general object of my present invention is to provide improved connections between a differential pressure U-tube manometer and a fluid conduit adapted to avoid disturbances in operation and inaccuracies as a result of the disturbances in the positions of the manometer and conduit relative to a horizontal level resulting from movements of a ship when used on the latter. More specifically, the object of my invention is to connect a differential pressure U-tube manometer to a conduit, containing a fluid, the rate of flow of which is to be measured, in such a manner that relative motion between the sealing liquid in the manometer and the manometer casing will be prevented during the movements of the ship tending to cause the sealing liquid to flow from one leg into the other leg of the manometer.

The various features of novelty which characterize my invention are pointed out with particularity in the claims annexed to and forming a part of this specification. For a better understanding of this invention, however, and the advantages possessed by it reference should be had to the accompanying drawings and descriptive matter in which I have illustrated and described a preferred embodiment of the invention.

Of the drawings:

Fig. 1 is an elevation partly in section of a preferred form of my invention.

Fig. 2 is a view showing the apparatus of Fig. 1 tilted from the horizontal.

In the drawings, I have illustrated one form of my invention as applied to a flow meter installation on shipboard and in which a manometer B of the differential pressure U-tube type is connected to a conduit A in which flows steam or other fluid, the rate of flow of which is to be measured, the direction of flow being indicated by the arrow in Fig. 1. In the conduit A is provided an orifice plate A′ secured between the adjacent flanged ends of two pipe sections.

The manometer B is constructed in a manner similar to that shown in my prior application Serial No. 78,148 filed Dec. 29, 1925, and comprises a high pressure chamber B′ and a low pressure chamber $B^2$, the lower ends of which are connected by a passage $B^8$ and the chambers of which are partially filled with a sealing liquid such as mercury. In the construction shown, the high pressure chamber is connected to the conduit A at the point $A^2$ on the high pressure side of the orifice plate A′ by a pipe $B^3$, a condenser or liquid reservoir E and a vertical pipe $B^5$. The low pressure chamber $B^2$ is connected to a point $A^3$ on the low pressure side of the orifice plate by a pipe $B^4$, a condenser or liquid reservoir F and a pipe $B^6$. Condensers E and F are located at the same level above the manometer supporting base. In the construction shown, the pipes $B^5$ and $B^6$, and the condensers E and F are automatically filled with condensed steam to a point on a level with the connections of the pipes $B^3$ and $B^4$ to the corresponding condensers. Valves $B^7$ are provided in the pipes $B^3$ and $B^4$ to disconnect the manometer from the conduit when desired. The drop in pressure across the orifice plate is recorded in the manometer by the difference in levels of the sealing liquid in the high and low pressure chambers. This pressure differential is transmitted to a suitable indicating or recording instrument by a float C vertically movable in the high pressure chamber B′ and to which is connected an armature C′. The armature C′ moves vertically to change the inductances in a pair of superposed coils D′ and $D^2$ forming part of an impedance bridge system such as shown in my prior application Serial No. 78,148, filed Dec. 29, 1925.

The ordinary movements of a ship, rolling, pitching, and yawing or combinations of those movements may be resolved into components about one or more of three axes. My invention contemplates broadly the location of the manometer on a horizontal level with the longitudinal axes of the manometer legs in a plane at an angle to, parallel with or along either horizontal axis of the supporting base. When arranged in this manner the sealing liquid is only affected by movements of the support having components moving the manometer about an axis transverse to the plane containing the axes of the manometer legs. Components moving the manometer about an axis parallel with or in the plane of the manometer legs do not cause movements of the sealing liquid from one leg to the other.

In the preferred form shown, the manometer is arranged in position with the longitudinal axes of the legs in a plane parallel to or in the line of the longitudinal axis of the ship. With this arrangement, on a roll of the ship to either side, there is no material variation in the relative surface levels of the sealing liquid in the high and low pressure chambers. On a tilting movement of the ship about an axis transverse to a plane parallel with the vertical axes of the manometer chambers such as shown in Fig. 2, the sealing liquid tends to flow from one manometer chamber to the other. This would ordinarily result in a vertical movement of the float and armature which would cause an inaccurate reading in the recording instrument. With the method of connecting the manometer chambers to the conduit contemplated by the present invention such movements of the float will be minimized, if not wholly prevented.

In explaining and defining the invention, it is convenient to regard the manometer chambers proper, the conduits $B^5$ and $B^6$, and the condensers E and F, as forming a differential pressure gage having two limbs, one of which includes the condenser F, pipe $B^6$ and chamber $B^2$, while the other includes the condenser E, conduit $B^5$ and manometer chamber $B'$. The upper portions of the two limbs cross one another so that the side by side relation of the condensers E and F is reversed with respect to the side by side relation of the lower portions of the corresponding limbs of the gage. In consequence of this relation when the gage tilts, as shown in Fig. 2, about an axis transverse to a plane to which the axes of all portions of the gage limbs are parallel or approximately so, the net change in the gravital head effect of the water in the gage upon the sealing liquid neutralizes the gravital tendency of the heavier sealing liquid to flow from one manometer chamber into the other as a result of said tilting movement provided the parts are suitably proportioned. To proportion the parts for this purpose I determine the relative length and position of the connections in the following manner. Let the density of the sealing liquid be indicated by the reference letter D, that of the liquid in the pipes $B^5$ and $B^6$ and condensers E and F by $d$, the distance between the centers of the manometer legs by X, the distance between the centers of the condensers by Y and the pressure differential between the points $A^2$ and $A^3$ by the value H—L, H representing the high pressure and L the low pressure. The difference in level of the surfaces of the sealing liquid in the manometer chambers is a function of the drop in pressure across the orifice plate and of the pressure head due to the columns of liquid in the pipes $B^5$, $B^6$ and the condensers E and F. When the manometer is in a horizontal position, the liquid in the condensers E and F will be at the same level and the difference in level of the sealing liquid surfaces will be a function of the pressure drop through the orifice since the liquid heads in the pipes will be equal. When the manometer is tilted in a direction parallel to the axes of the manometer chambers at an angle $w$ with the horizontal as shown in Fig. 2, the liquid levels in the condensers E and F are no longer the same while the pressure differential across the orifice plate will remain the same. In this position the liquid in the condensers and the sealing liquid in the chambers flows from one chamber to the other. As shown by the lower triangular diagram in Fig. 2, the vertical movement of the measuring liquid is equal to X sin $w$. The vertical displacement of the liquid in the condensers as shown by the upper triangular diagram is equal to Y sin $w$. The corresponding change in pressure difference between the surfaces of the manometer sealing liquid will then be DX sin $w$, and the change in pressure differential exerted on these surfaces will be equal to the sum of the pressure difference due to the change in levels of the liquid in the condensers and the pressure difference of an amount of the liquid of less density corresponding to the change in levels of the sealing liquid which is equal to $d$ Y sin $w$ plus $d$ X sin $w$. In accordance with the present invention, the apparatus is so proportioned that the change in pressure difference between the surfaces of the sealing liquid and the change in pressure differential exerted on these surfaces is equal. That is $$DX \sin w = dX \sin w + dY \sin w$$

or $$DX = dX + dY$$

or $$Y = X\left(\frac{D-d}{d}\right)$$

This value for the distance Y, since the distance X for any given instrument is constant and the densities D and $d$ are constant for the liquids in use will be the correct distance at which the condensers E and F should be spaced to attain the desired results. With the apparatus so proportioned there will be little, if any, movement of the liquid in the apparatus on movements of the supporting base about axes transverse to the axes of the manometer legs.

In the steam flow meter illustrated in the drawings, each limb of the gage always has a definite portion of its length filled with liquid, the upper end of the column or body of liquid in each limb being determined by the point of connection to the corresponding condenser E or F of the pipe connections $B^3$ and $B^4$, water of condensation being constantly added to make up for any spillage from either condenser back into the conduit A, as a result of the tilting movement to which the gage may be subjected.

The differential pressure gage shown in the drawings can also be used for other purposes than as part of a steam flow meter where compensation for tilting movements of the gage is desired. For example, if the apparatus shown in the drawings be used as a flow meter for air or other gas, as distinguished from a vapor, substantial compensation for tilting movements of the gage may be secured. In such cases, the quantity of the lighter liquid in the gage may be such that none of this liquid will spill out of the gage when the latter is subjected to its maximum tilting movement.

The measuring system illustrated is characterized by the reliability and effectiveness of the manometer compensating means and the relatively simple computations by which the proper proportioning of the connections can be determined. While in accordance with the provisions of the statutes, I have illustrated and described the best form of my invention now known to me, it will be apparent to those skilled in the art that changes may be made in the form and arrangement of the apparatus without departing from the spirit of my invention as set forth in the appended claims, that my invention is applicable to other types of installations wherein similar disturbances of the supporting structure occur, and that certain features of the invention may sometimes be used with advantage without a corresponding use of other features.

Having now described my invention, what I claim as new and desire to secure by Letters Patent, is:

1. A flow meter for measuring the flow of a fluid through a conduit comprising a differential pressure U-tube manometer having high and low pressure chambers connected at their lower ends and partly filled with a sealing liquid of a predetermined density, means responsive to the sealing liquid level in one of said chambers, said manometer being rigidly mounted on a base subject to tilting movements about axes parallel and perpendicular to the plane including the longitudinal axes of said chambers, a pair of horizontally spaced reservoirs above said manometer and partly filled with a liquid of less density than said sealing liquid and having separate pipe connections to points of high and low pressure in said fluid conduit, means for maintaining a constant liquid level in each of said reservoirs, two pipe connections crossing one another one of which connects one of said reservoirs to said high pressure chamber and the other of which connects the other of said reservoirs to said low pressure chambers, said two pipe connections containing said liquid of less density and transmitting the fluid pressures in said conduit and the liquid heads in said last mentioned pipe connections to said sealing liquid, said last mentioned pipe connections being arranged and said reservoirs being horizontally spaced in a predetermined manner that on a tilting movement of said base about a perpendicular axis a change is effected in the liquid head of each of said liquid columns proportionate to and neutralizing the force tending to vary the sealing liquid level in the corresponding pressure chamber, the horizontal spacing of said reservoirs being proportionate to the difference in densities of said liquid of less density and said sealing liquid.

2. A steam flow meter for measuring the flow of steam through a conduit comprising a differential pressure U-tube manometer having high and low pressure chambers connected at their lower ends and partly filled with a sealing liquid, means responsive to the sealing liquid level in one of said chambers, said manometer being rigidly mounted on a base subject to tilting movements about axes parallel and perpendicular to the plane including the longitudinal axes of said chambers, a pair of horizontally spaced condensers having separate pipe connections to points of high and low pressure in said conduit, said pipe connections being arranged to maintain a constant and equal water level in said condensers, two water filled pipe connections crossing one another and extending one between one of said condensers and said high pressure chamber and the other between the second of said condensers and said low pressure chamber, said two connections transmitting the steam pressure in said condensers and the water columns to said sealing liquid, said last mentioned pipe connections being arranged and said condensers being horizontally spaced in a predetermined manner that on a tilting movement of said base about a perpendicular axis a change is effected in the effective head of each of said water columns proportionate to and neutralizing the force tending to vary the sealing liquid level in the corresponding pressure chamber, the spacing of said condensers being proportionate to the difference in densities of said water and sealing liquid.

3. A flow meter for measuring the rate of flow of a fluid in a conduit and comprising a differential U-tube manometer having high and low pressure chambers, a sealing liquid partially filling said pressure chambers, and liquid reservoirs having pipe connections with said pressure chambers and with points of different pressure in said conduit, the reservoirs, pressure chambers and pipe connections being in substantially the same vertical plane, and the pipe connections between the reservoirs and pressure chambers crossing one another, a liquid of less density than said sealing liquid filling said reservoirs, said pipe connections, and said pressure chambers above the sealing liquid, the liquid level in each of said reservoirs being constant, and the centers of said reservoirs being spaced apart a distance equal to $$X\frac{(D-d)}{d},$$

where X is the distance between the vertical center lines of the pressure chambers and D and $d$ are the densities of the sealing liquid and reservoir liquid, respectively.

4. Apparatus for measuring the flow of a gaseous fluid through a conduit and adapted for use under conditions subjecting said apparatus to tilting movements about horizontal axes perpendicular to one another and comprising in combination, a differential pressure U-tube manometer having high and low pressure chambers connected at their lower ends and partly filled with a sealing liquid and having their axes located in a normally vertical plane and laterally displaced from one another with respect to said plane, a high pressure reservoir located at a level above said high pressure chamber, a pipe connection between said high pressure reservoir and high pressure chamber, a low pressure reservoir located at the same level as the high pressure reservoir, a separate pipe connection between said low pressure reservoir and said low pressure chamber, another liquid of a density less than said sealing liquid filling said pipe connections and partially filling said reservoirs, means for maintaining said other liquid at a constant level in each of said reservoirs, separate connections for transmitting pressure to the two reservoirs from said conduit, and means responsive to the displacement of sealing liquid from one chamber into the other, said reservoirs having their axes similarly disposed in a direction transverse to said plane, whereby movement of said apparatus about a horizontal axis parallel to said plane does not tend to produce said displacement, said pipe connections crossing one another and said high and low pressure reservoirs having their axes laterally displaced from one another relative to said plane in a direction opposite to that in which the axes of said high and low pressure chambers are displaced by an amount proportionate to the difference in density of said sealing liquid and other liquid so that on a movement of said apparatus about a horizontal axis perpendicular to said plane, the elevation of the portion of said other liquid in one of said reservoirs and pipe connection thereto relative to the portion of said other liquid in the other reservoir and other pipe connection substantially neutralizes the tendency of said sealing liquid to be displaced by the last mentioned movement.

Signed at Philadelphia, in the county of Philadelphia and State of Pennsylvania, this 12th day of March, A. D. 1927.

THOMAS R. HARRISON.